United States Patent Office 2,890,144
Patented June 9, 1959

2,890,144

COMPOSITION COMPRISING A VINYL MONOMER AND A POLYESTER OF A POLYHYDRIC ALCOHOL, AN UNSATURATED ACID, A SATURATED ACID AND A HEXAHALOCYCLOPENTADIENE ADDUCT AND LAMINATED ARTICLE CONTAINING SAME

Paul Robitschek, Wilson, and Claude Thomas Bean, Niagara Falls, N.Y., assignors to Hooker Chemical Corporation, Niagara Falls, N.Y., a corporation of New York No Drawing. Application January 24, 1957
Serial No. 635,951

10 Claims. (Cl. 154—43)

This invention relates to new resinous compositions, and to methods for their manufacture, comprising a copolymerizable mixture of an unsaturated polyester (also referred to in the art as an unsaturated alkyd, or, unsaturated linear polyester of unsaturated polyester chain resin) and an unsaturated cross-linking agent, said mixture including a chemically combined component which imparts flame retardance to the polymerized mixture and which is of an adduct of a 1–4 addition of hexahalocyclopentadiene with a dienophile as hereinafter defined. This invention also relates to the polymerized flame retardant compositions in their finally reacted form, that is, as resinous, insoluble, infusible, copolymers, and to methods for their preparation.

The production of infusible, insoluble polyester resins which are flame retardant and have high resistance of heat is of considerable commercial importance. For instance, castings, moldings, foamed articles or laminated structures bonded by polyester type resins are for many uses required, or at least desired, to be resistant to fire and are also required to endure heat without deterioration. A typical illustration of an application having such a requirement is had in castings for live electrical contacts which must not be ignited by sparks or be deteriorated by heat generated therein. Structural members, pipes, wall coverings and panels and miscellaneous items such as ash trays, etc., are further illustrations where flame retardance is desirable.

Heretofore certain chemical adducts have been disclosed as being useful in the preparation of polyester resins; for example, it is known that the maleic acid-cyclopentadiene Diels-Alder adduct resulting from the diene synthesis and its reaction products with alpha, beta-unsaturated dicarboxylic acids or anhydrides and glycols form resinous compositions which may be made insoluble and infusible by further reaction with copolymerizable olefins to form a cross-linked copolymer. Such compositions are chemically different from the products of this invention because the double bond remaining in the linear unsaturated polyester so produced is highly reactive and can enter directly into the cross-linking reaction, whereas, the corresponding linkage in the halogen-containing derivatives employed in making the compositions of this invention is non-reactive in said copolymerization reaction; moreover, they do not possess flame retardance. Attempts have been made to impart flame retardance to such hydrocarbon type resinous polyester compositions by incorporating therein inert fireproofing agents, such as antimony oxide or chlorinated paraffin wax, as fillers, which do not enter into chemical reaction with the components of the resin; however, this results in a loss in the desirable properties, particularly with respect to heat resistance, which are usually associated with polyester resins, and the property of being able to produce satisfactory articles of commerce may be seriously impaired.

Other attempts to impart flame retardance are also known which involve chemically combining tetrachlorophthalic acid or anhydride in the polyester resin. Compositions so produced are chemically unrelated to the products of this invention; they have only poor flame retardant properties and they usually possess low stability and low strength at elevated temperatures; therefore, they are not entirely satisfactory for many applications. Still other attempts involving the use of certain unsaturated organic phosphorus compounds as cross-linking agents which impart flame retardance to the final polyester resin have likewise been found unsatisfactory.

It is an object of this invention to provide resinous compositions which are highly resistant to burning and yet possess many of the desirable characteristics usually associated with polyester resins. A further object is to provide resinous compositions which are highly resistant to exposure at elevated temperatures. A still further object is to prepare resinous compositions which are suitable for casting, molding, foaming or laminating and which are characterized by possessing the desirable properties usually required in resins in the preparation of castings, moldings, foamed articles and laminates, and which are also characterized by being capable of forming articles of commerce which have a pleasing appearance and wide utility. A particular object of this invention is to prepare resinous compositions which are characterized by high impact resistance and improved toughness and flexibility. Another object of this invention is to make available in commerce compositions comprising a mixture of an unsaturated polyester and an olefinic cross-linking agent, with or without the presence of catalysts and/or inhibitors and/or chain terminating agents and/or promoters or accelerators, which are capable of copolymerization to an insoluble, infusible, fire resistant polyester resin. A further objective is to provide methods for chemically combining hexahalocyclopentadienes in the form of an adduct into the polyesters. A still further objective is to provide methods for the preparation of these unsaturated polyesters and their combination with olefinic cross-linking agents. These objects, and still others which will become apparent to those skilled in the art on consideration of our specification and claims, are accomplished by the present invention.

In accordance with this invention the unsaturated polyester may contain the component which imparts flame retardance in either the poly-carboxylic acid or anhydride unit of the polyester. The unsaturated polyester must contain unsaturation which is capable of copolymerization with the unsaturation in the cross-linking agent. Such copolymerizable unsaturation is an essential characteristic of the unsaturated polyester portion of the mixture of this invention. We have found that the double bond, remaining in a polyester chain, which is derived from the reaction adducts of hexahalocyclopentadienes with mono-olefinic polycarboxylic acids or anhydrides, or mono-olefinic polyhydric alcohols or esters thereof including acid chlorides is not sufficiently reactive to enter into the cross-linking reaction. We render such polyesters copolymerizable in the cross-linking reaction by incorporating in the esterification product a reactive and unsaturated chemical ingredient which retains its active unsaturation after being chemically combined in the polyester chain. Alternatively, or in addition to including flame retardant components in the unsaturated polyester, as just described, and in accordance with this invention, the cross-linking agent may contain the component which imparts flame retardance to the polyester resins of this invention.

The reactant components which impart flame retardance to the final polymerized resinous compositions by their incorporation in either the linear polyester or the unsaturated cross-linking agent may best be prepared by effecting the chemical addition of a hexahalocyclopentadiene with an unsaturated polycarboxylic acid or acid anhydride or an acid halide, or an unsaturated polyhydric alcohol, or esters thereof, presumably in accordance with the following equations, in which the specific reactants are given for purposes of illustration only:

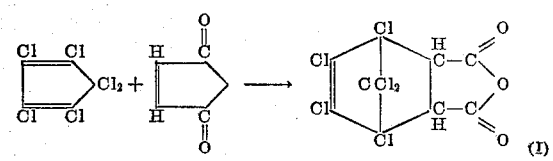

(I)

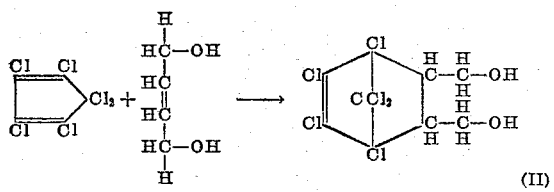

(II)

These, and similar Diels-Alder type reaction adducts of hexahalocyclopentadienes which are more fully disclosed hereinafter, can be esterfied with a polyhydric alcohol or a polycarboxylic acid, to produce a soluble polyester chain containing the olefinic linkage originally present in the Diels-Alder adduct, as exemplified by the following product formed by esterification of the product of the Reaction I with ethylene glycol:

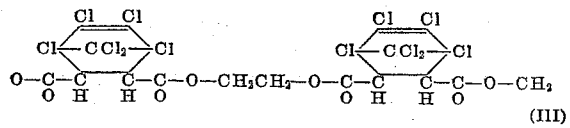

(III)

The olefinic linkage contained in such chlorine containing polyester chains (III), has been found by us to be unreactive in the copolymerization reaction with olefinic cross-linking agents, such as styrene, vinyl acetate, divinyl compounds, diallyl compounds, etc, even in the presence of the most active catalyst of such reactions. However, to render polyesters containing the Diels-Alder adducts of hexahalocyclopentadiene copolymerizable with olefinic cross-linking agents, whereby infusible, insoluble and flame retardant copolymers may be produced, we introduce copolymerizable unsaturation into the polyester chain by esterifying the foregoing components in the presence of a reactive unsaturated chemical ingredient which is capable of rendering the polyester copolymerizable even after it is in chemical combination in the polyester molecule. The preparation of said adduct used in said polymerizable mixture is such that a polymerized cross-linked resin having preferably a chlorine content between preferably 10 to 45 percent by weight is obtained. A particularly suitable material for this use is maleic anhydride; however any unsaturated polycarboxylic acid or anhydride, or, polyhydric alcohol, or, esters thereof, including the acid chlorides, capable of esterification without losing its ability to copolymerize with olefinic cross-linking agents may be employed. Alternatively, or in addition to providing unsaturation in this manner, we may also provide for it by employing a Diels-Alder reactant with hexahalocyclopentadiene which has more than monoolefinic unsaturation, for example, a di-olefin or an acetylenic compound, and which retains, after being esterified in the polyester chain an unsaturated linkage reactive in the cross-linking reaction.

The resinous copolymers of this invention may be prepared in several ways, the following described ways being set forth as illustrative only. They may be prepared by first effecting the esterification of the selected polycarboxylic acids with the desired polyhydric alcohols in the presence of the reactive unsaturated chemical ingredient, whereby an unsaturated polyester is formed; then mixing the resulting composition with the chosen copolymerizable olefinic cross-linking agent; and, thereafter copolymerizing the mixture to form an insoluble, infusible polyester resin. Another method which may be employed for producing resinous copolymers of this invention which is in accordance with our findings comprises effecting the chemical addition of hexahalocyclopentadiene to less than the total theoretical number of olefinic linkages contained in an unsaturated polyester molecule. For example, by effecting the Diels-Alder reaction of one molecule of hexahalocyclopentadiene with more than one molecule of ethylene glycol maleate, a product is produced which contains the hexahalocyclopentadiene in chemical combination in the polyester chain and which also contains active unsaturation which is copolymerizable in the cross-linking reaction; the product so produced is then mixed with the chosen olefinic cross-linking agent and thereafter copolymerized in a manner similar to that described. Esterification of the desired ingredient may be effected in the presence of esterification catalysts and/or chain terminating agents. A preferred procedure involves introducing the selected ingredient to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, an outlet, and any other accessories necessary for the reaction. The charge reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product, if solid, and if prepared in accordance with the first procedure described, is broken up and then mixed with the olefinic cross-linking agent at room temperatures, preferably in the presence of a polymerization inhibitor. If prepared in accordance with the second method, a hexahalocyclopentadiene is chemically added to a soluble unsaturated polyester molecule in an amount insufficient to react out all the double bonds in the polyester and the material resulting by this treatment is then compounded with the olefinic cross-linking agent.

We have found that the cross-linking agent may be advantageously combined with unsaturated polyesters prepared in accordance with these methods while the unsaturated polyester is at an elevated temperature and that the olefinic cross-linking agent may also be at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing or effecting the copolymerization reaction into the insoluble, infusible, polyester resin. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

In order that this invention may be more readily understood and to further illustrate the details thereof, the following examples are given which show preferred compositions of this invention and methods for their preparation. Certain of the Diels-Alder adducts of hexahalocyclopentadienes disclosed herein are new compositions of matter.

In the following examples, in which parts are given by weight unless otherwise stated, the common properties of the resins were determined by the generally accepted procedures known in the art.

EXAMPLE 1

Fifty-two and eight-tenths parts of ethylene glycol and 90 parts of diethylene glycol were charged into an esterification or resin vessel provided with heating and/or cooling means, an agitator, means for maintaining an atmosphere of an inert gas over the reaction mixture, means for removing water of esterification, temperature recording means, charging inlets and outlets, etc. The charge was blanketed with an inert atmosphere of nitrogen, agitated, heated to a temperature between about 80 to 100 degrees centigrade, then 394.7 parts of 1,4,5,6,7,7-hexachlorobicyclo-(2.2.1)-5-heptene-2,3-dicarboxylic anhydride (hereinafter referred to as HET), prepared by the method which involves the Diels-Alder reaction of hexachlorocyclopentadiene with maleicanhydride, was blended into the agitated glycols. Seventy and eight-tenths parts of maleic anhydride was then blended into the charged reactants while the reaction mixture was being raised to a temperature of about 160 to 170 degrees centigrade by application of external heat. The water of esterification liberated during the reaction was separated and periodically measured and the acid number of the reaction mixture was also periodically measured to determine the progress of the reaction. When an acid number of approximately 55 was reached, 3.6 parts of tetrahydrofurfuryl alcohol was added to the reaction mixture. Upon reaching an acid number of about 45, the entire contents of the reaction vessel was cooled, then cast into pans under an inert atmosphere. A transparent, faintly colored, hard, brittle, soluble material, having 38.4 percent by weight chlorine content, which melts in a temperature range above room temperature and below 100 degrees centigrade and has a specific gravity at room temperature of about 1.45 was obtained.

EXAMPLE 2

One hundred grams of the cast product recovered in Example 1 was broken into small lumps, then added in small portions, with agitation, to 30 grams of styrene maintained under an inert atmosphere, containing 0.03 gram of hydroquinone, until completely dissolved. Complete solution consumed a period of more than 24 hours even with continued vigorous agitation. The resulting mixture was a clear, substantially colorless solution having a viscosity of about 30 poises at 25 degrees centigrade on a Gardner bubble viscometer.

EXAMPLE 3

Fifty parts of the mixture prepared in Example 2 were agitated with 0.5 part of a catalyst mixture comprising 50 parts of benzoyl peroxide and 50 parts of tricresyl phosphate. The resulting mixture was cast in 10 millimeter diameter glass tube and set by heating at a temperature of about 80 degrees centigrade for a period of about one-half hour. A hard, tough, clear, insoluble, infusible substantially colorless polyester resin was obtained which has a 30 percent chlorine content by weight and is immediately self-extinguishing on removal from an oxidizing flame.

The data in the following example is reproduced from Example 15 of our parent and copending application, Serial No. 308,921, filed September 10, 1952, now United States Patent 2,779,701, of which this application is a continuation-in-part.

EXAMPLE 4

Into a suitable reaction vessel were charged 105.4 parts of HET, 18.5 parts of maleic anhydride, 16.3 parts of sebacic acid, 16.7 parts of ethylene glycol and 28.6 parts of diethylene glycol. The esterification was carried out at an elevated temperature of approximately 148 degrees centigrade under an inert atmosphere of carbon dioxide until an acid number of 42 was reached. To 1000 parts of the unsaturated polymerizable resin was added 300 parts of styrene containing 0.11 part of hydroquinone inhibitor. Polymerization was carried out in a manner after Example 3. There was obtained a tough, clear, infusible, insoluble, resinous material having a chlorine content of 26 percent and which was self-extinguishing upon removal from an oxidizing flame.

The following example is set forth to illustrate the adducts of hexachlorocyclopentadiene and polyhydric alcohols containing aliphatic carbon to carbon unsaturation may also be used with equally good results, in making the compositions of this invention.

EXAMPLE 5

Into a suitable reaction vessel were charged 607.4 parts of the adduct of hexachlorocyclopentadiene and alpha allyl glycerol ether, 31.0 parts of ethylene glycol, 73.1 parts of adipic acid and 147.1 parts of maleic anhydride. The esterification was carried out at an elevated temperature of approximately 165 degrees centigrade under an inert atmosphere of carbon dioxide until an acid number of 30 was reached. To 1000 parts of the unsaturated polymerizable resin was added 400 parts of styrene containing 0.11 part of hydroquinone inhibitor. Polymerization was carried out in a manner after Example 3. There was obtained a tough, clear, infusible, insoluble, resinous material, having a chlorine content of 30 percent and which was self-extinguishing upon removal from an oxidizing flame.

The later examples set forth in chart form illustrate formulations similar to that of Example 4 except that polycarboxylic compounds other than sebacic acid are employed. These polycarboxylic compounds may be selected from either aliphatic groups, shown in Chart I or aromatic groups shown in Chart II, and may also be employed in varying proportions. All of the materials included in these groups are characterized by the lack of cross-linking or copolymerizable unsaturation in their structures. Such materials include: isophthalic acid; succinic acid; suberic acid; tetrachlorophthalic acid; dimethyl succinic acid; sebacic acid; adipic acid; azelaic acid; and chlorinated derivatives of the foregoing acids except tetrachlorophthalic acid; also it is to be understood that the acid anhydrides are the equivalents of the acids. Mixtures of any two of the acids are contemplated.

The adduct of hexachlorocyclopentadiene and maleic acid or 1,4,5,6,7,7-hexachlorobicyclo-(2.2.1)-5-heptene-2, 3-dicarboxylic acid (hereinafter referred to as HET acid) or HET may be used interchangeably in these examples. It should also be understood that other adducts of hexahalocyclopentadiene may be used in place of HET or HET acid. Among such adducts which may be used in preparing the compositions of this invention are: adduct of hexahalocyclopentadiene and fumaric acid; adduct of hexachlorocyclopentadiene and maleic anhydride diesterified with allyl alcohol; adduct of hexahalocyclopentadiene and citraconic anhydride; adduct of hexahalocyclopentadiene and maleic anhydride, half esterified with methanol; adduct of hexahalocyclopentadiene and alpha allyl glycerol ether; adduct of 1,2,3,4-tetrachloro-5,5-difluorocyclopentadiene and maleic anhydride; adduct of hexahalocyclopentadiene and itaconic anhydride; adduct of hexahalocyclopentadienes and 2-butene-1,4-diol; and, adduct of hexahalocyclopentadiene and chloro maleic anhydride.

Chart I

| Ex. No. | Pts. of HET Acid | Pts. of Fumaric Acid | Pts. of Maleic Anhydride | Pts. of Diethylene Glycol | Pts. of Ethylene Glycol | Pts. of Adipic Acid | Pts. of Azelaic Acid Emory 901R* | Pts. of Dimer Acid | Pts. of Diglycolic Acid | Pts. of Iso-Sebacic Acid | Acid Number Base Resin | Percent Chlorine Base Resin |
|---|---|---|---|---|---|---|---|---|---|---|---|---|
| 6 | 388.9 | | 34.8 | | 218.0 | 315.5 | | | | | 19.6 | 25 |
| 7 | 388.9 | 42.2 | | | 124.2 | | | 364 | | | 28.6 | 25 |
| 8 | 3,691 | 700 | | 182.8 | 102.6 | 399 | | | | | 17.8 | 35.7 |
| 9 | 610.2 | 95.4 | | 18.1 | 238.8 | | | | | 325.3 | 18 | 29 |
| 10 | 46.7 | 8.5 | | 26.2 | | | | | 7.2 | | 18 | 36 |
| 11 | 1,132.0 | 141.7 | | | 558.2 | | 937.0 | | | | 18 | 25.2 |

| Ex. No. | Parts Styrene per 100 Resin | Percent Chlorine Resin Compound | Type Resin | Shore A₂ Hardness | Barcol Hardness | Ultimate Tensile Strength lbs./sq. in. Tested at 2 in./min. | Tensile Strength Tested at 0.05 in./min., lbs./sq. in. | Elongation in Break At Tensile, Percent | Self-extinguishing |
|---|---|---|---|---|---|---|---|---|---|
| 6 | 30 | 19.2 | Flexible | 94 | | 910 | | 110 | Yes. |
| 7 | 30 | 19.2 | do | 100 | | 2,180 | | 65 | Yes. |
| 8 | 40 | 25.5 | Semi-rigid | | 28 | | 8,300 | 4.0 | Yes. |
| 9 | 40 | 21 | do | | 30 | | | | Yes. |
| 10 | 40 | 26 | do | | 35 | | 9,400 | 4.0 | Yes. |
| 11 | 30 | 19 | Flexible | 98 | | 2,090 | | 89 | Yes. |

*Emory 901R is a mixture of C₉ and C₁₁ dibasic acids, 85/15 ratio.

Chart II

| Ex. No. | Charge of HET Acid | Charge of HET Anhydride | Charge of Fumaric Acid | Charge of Ethylene Glycol | Charge of Isophthalic Acid | Charge of Phthalic Anhydride | Charge of Terephthalic Acid | Percent Chlorine Base Resin | Parts Styrene P/H/R | Percent Chlorine Resin Cpd. | Self-extinguishing |
|---|---|---|---|---|---|---|---|---|---|---|---|
| 12 | 369.5 | | 76.6 | 127.9 | 74.7 | | | 20 | 35.0 | 25 | Yes. |
| 13 | 3,528 | | 643.3 | 1,150 | | | 678.6 | 20 | 36 | 25 | Yes. |
| 14 | | 352.4 | 76.6 | 127.9 | 74.7 | | | 20 | 35.0 | 25 | Yes. |

The following example is set forth to demonstrate the importance of the compositions of this invention in order to obtain a resin having high impact resistance qualities. High impact resistance qualities are necessary for such applications as automobile bodies, structural walls, etc.

EXAMPLE 15

The styrenated resin compositions of Example 2 and of Examples 6, 8, and 12 were compounded with 33 parts of finely divided calcium carbonate and 2 parts of Luperco ATC, a 50-50 mixture of benzoyl peroxide and tricresyl phosphate. These filled resins were used to make glass mat reinforced moldings in a matched metal die, steam heated press. The finished molded panels contained 40 percent glass by weight and were 0.1 x 12 x 12 inches in size. These panels were fully cured by heating in the press at 120 degrees centigrade for five minutes. They were then allowed to cool to room temperature, stored at 23 degrees centigrade for 24 hours and then subjected to an impact test at this temperature.

This impact test consists in dropping a steel ball having a diameter of 1.5 inches and weighing one half pound onto the molded panel which is firmly supported between two aligned horizontal rings, both six inches in diameter. The ball is dropped from a measured height onto the panel into the center of the rings. A dye stain is then liberally applied to the side of the panel opposite the point of impact. When the excess stain is wiped from the panel, any cracks caused by the impact become visible. The ball is dropped at one inch intervals beginning at a vertical distance three inches above the panel. The point of failure is the lowest height in inches from which the ball is dropped causing a crack to be formed.

The panels formed from the resins of Examples 2, 6, 8, and 12 and their points of failure are given below:

| Panel from Resin of Example | Point of failure in inches |
|---|---|
| 2 | Less than 3. |
| 6 | Greater than 16 |
| 8 | 8. |
| 12 | 9. |

In the claimed compounds, of this application, which is a continuation-in-part of our previously filed application Serial Number 308,921, filed September 10, 1952, these polycarboxylic compounds free from cross-linkable, copolymerizable unsaturation are essential parts thereof and are used in order to improve the impact resistance and toughness of the final copolymerized resins.

The processing techniques and the chemical reactions depicted herein for producing the necessary ingredients to be used in making the compositions of this invention may also be varied without departing from our invention.

The temperature for carrying out the reaction between the polyhydric alcohols and polybasic acids ranges from 100 degrees centigrade to 200 degrees centigrade, although higher or lower temperatures can be used; preferably around 150 degrees centigrade to 180 degrees centigrade is advantageously employed.

An inert gas such as nitrogen is passed through the mixture in a preferred procedure to accelerate the progress of the reaction and allow for good color of the product. The progress of the reaction is followed by measuring the rate of water liberated, by the viscosity of the resin, by its acid number, or by other methods commonly known in the art. The extent to which the reaction is carried out will depend on a number of factors, such as the desired viscosity, melting point, duration or reaction, etc.

Esterification catalysts such as para-toluene sulphonic acid, benzene sulphonic acid, beta naphthalene sulphonic acid, etc., or amines such as pyridine, triethyl amine, quinoline, etc., may be added to the reaction mixture.

The proportion of polyhydric alcohol is approximately controlled by the total mol proportion of acids in the esterification reaction mixture. In making certain compositions of our invention we prefer to react the polyhydric alcohols and polybasic acids in a roughly equimolar proportion, however, either the acids or alcohols may be in substantial excess, if it is desired to form a low molecular weight polyester resin.

A chain stopper may be added in a minor proportion depending on the molecular weight of the linear unsaturated polyester chain desired, in order to rapidly terminate the growth of the unsaturated polyester chain during the esterification reaction and when the desired acid number is being approached, or, to reduce the number of free carboxyl or hydroxyl groups, or, to introduce a hydrocarbon terminal residue. Among the compounds which may be used as chain stoppers during the esterification reaction whereby the unsaturated polyester chain is produced are a wide variety of monohydric alcohols, such as butyl, hexyl, octyl, dodecyl, benzyl, and tetrahydrofurfuryl alcohols, or, monobasic acids such as, acetic, propionic, butyric, ethyl hexoic, and benzoic.

The solution or mixture of unsaturated polyester and olefinic cross-linking agent is preferably made while the unsaturated polyester is still hot, as illustrated among the foregoing examples, thereby facilitating rapid solution. Alternatively, the unsaturated polyester may be cooled and stored and when ready for mixing may be heated in order to facilitate solution in the olefinic cross-linking agent, which may also be heated. The solution may, of course, be made in the cold, especially if there is any possibility of explosion in handling the hot olefinic cross-linking agent or if polymerization of the olefinic cross-linking agent cannot be prevented when at elevated temperatures even by the presence of inhibitors therefor.

The proportion of olefinic cross-linking agent to unsaturated polyester may be varied within the ultimate limits of each without departing from the scope of this invention, in order to make the solution or mixture of this invention which may be set to the infusible, insoluble, polyester resin. For example, only a small proportion of olefinic cross-linking agent is needed when the proportion of reactive cross-linkable olefinic bonds in the unsaturated polyester is very small; and a still smaller proportion of olefinic cross-linking agent may be employed if it is desired to react only a part of the total of said unsaturated bonds in such polyester in the cross-linking reaction. On the other hand, a major proportion of olefinic cross-linking agent to unsaturated polyester may be employed when the proportion of reactive cross-linkable olefinic bonds in the unsaturated polyester is high; and a still higher proportion of olefinic cross-linking agent will be required if it is desired to react a major part of the total of said unsaturated bonds in such polyester in the cross-linking reaction. In general, the concentration of the unsaturated polyester in the olefinic cross-linking agent and unsaturated polyester mixture may vary between about 10 and 90 percent. In certain formulations and in order to accentuate a large number of desirable properties in the polyester resin produced, we find it preferable to employ between about 15 and 45 percent of the olefinic cross-linking agent by weight of the total resin and cross-linking agent, e.g. styrene, when the unsaturated polyester is similar to that produced in Example 1. However, it is to be understood that this preferred concentration is a variable which is dictated by the particular properties of the materials employed and the particular properties desired in the polyester resin produced.

Polymerization inhibitors, usually of the order of 0.001 to 1 percent of the composition may be added to prevent premature polymerization. Among the inhibitors which may advantageously be employed to prevent the premature polymerization of the mixture of unsaturated polyester and olefinic cross-linking agents, particularly if the mixture is to be stored or shipped in commerce prior to curing, are substances such as hydroquinone, benzoquinone, para-tertiary-butyl catechol, para-phenylene diamine, trinitrobenzene, and picric acid.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, and cumene hydroperoxide, have been found satisfactory. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, such as cobalt resinate, cobalt maleate, and cobalt naphthenate, or, by amines such as dibutyl amines, or mercaptans such as dodecyl mercaptan. These are used in proportions similar or smaller to that stated for catalysts.

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within the invention, thereby providing for a decided advantage over other resin mixtures known heretofore, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc.

Various hexahalocyclopentadienes may be employed in making compositions embraced within the scope of this invention. As used herein and in the appended claims the term "halo" includes the chloro, bromo and fluoro substituted cyclopentadienes wherein all of the hydrogens are replaced by one or more of the foregoing halogens. While hexachlorocyclopentadiene is today the most readily available commercial hexahalocyclopentadiene, we have found that the mixed perhalo compounds are useful in making Diels-Alder adducts which can be chemically combined into the saturated polyester components of this invention.

In fact, hexachlorocyclopentadiene in which one or two of the chlorine atoms has been replaced with bromine, appears to afford an even higher degree of flame retardance in the polyester resins. The polyester resins made from a hexahalocyclopentadiene in which some of the chlorine of hexachlorocyclopentadiene has been replaced with fluorine atoms, are exceedingly interesting materials possessing enhanced heat resistance and aging properties. The foregoing applies whether the hexahalocyclopentadiene is utilized as a raw material in the making of the copolymerizable linear polyester or the unsaturated cross-linking agent.

The compounds useful in making adducts of hexahalocyclopentadienes are dienophiles having a plurality of esterifiable groups, said dienophiles being defined as activated olefinic (or acetylenic) compounds which will form a Diels-Alder addition adduct with a conjugated diene system. These functional groups capable of esterification and having utility herein are found in compounds such as substituted or unsubstituted acids, anhydrides, acid halides, alcohols and esters, as hereinbefore illustrated.

The hexahalocyclopentadiene radical may be combined into the polycarboxylic acid unit of the unsaturated polyester chain in a variety of ways such as by effecting the Diels-Alder reaction of the hexahalocyclopentadiene with unsaturated polycarboxylic acids such as maleic or fumaric; substituted maleics or fumarics such as, citraconic, chloromaleic, mesaconic, and pyrocinchonic; acetylene dicarboxylic acids; and also ethylenic substituted succinic anhydrides or acids, such as aconitic and itaconic, and endomethylene tetrahydrophthalic acid or anhydride, etc. Instead of employing the polycarboxylic acids or anhydrides in the Diels-Alder reaction, adducts of hexahalocyclopentadiene with substances which produce an equivalent polyester chain upon reaction with a polyhydric alcohol can be used; for instance, acid chlorides, or, esters of the acids or anhydrides may also be used. A typical illustration is had in the Diels-Alder reaction of hexachlorocyclopentadiene with fumaryl chloride to produce 1,4,5,6,7,7-hexachyorobicyclo-(2.2.1)-5 - heptene - 2,3-dicarbonyl chloride followed by the esterification of this with ethylene glycol and maleic anhydride to produce the unsaturated polyester. In place of the acid chloride, diesters such as dimethyl maleate may be employed.

Alternatively the hexahalocyclopentadiene radical may be combined into the polyhydric alcohol unit of the unsaturated polyester chain in a variety of ways such as, by effecting the Diels-Alder reaction of the hexahalocyclopentadiene with unsaturated polyhydric alcohols such as, butene-diol or pentene-diol. Other suitable compounds are ethers or esters derived from polyhydric alcohols having at least three hydroxyl groups, one of which is esterified or etherified with an unsaturated alcohol or acid reactive with hexahalocyclopentadiene in the diene synthesis. For instance, allyl or vinyl glycerol ethers, allyl or vinyl pentaerythritol ether; and unsaturated acid esters of glycerol or pentaerylthritol, such as acrylic or methacrylic esters thereof may be used. Instead of employing a polyhydric alcohol in the Diels-Alder reaction, adducts of hexahalocyclopentadiene with substances which produce an equivalent unsaturated polyester chain, upon reaction with a polycarboxylic acid can be used; for instance, esters of the alcohols may also be used.

The unsaturated polyester chains produced by effecting the Diels-Alder reaction of hexahalocyclopentadiene with an unsaturated polycarboxylic acid or polyhydric alcohol, followed by the esterification of the product so produced with a polyfunctional alcohol or acid, can be rendered copolymerizable by chemically combining in such polyester chains, a reactive and unsaturated chemical ingredient which retains its active unsaturation after its chemical combination into the polyester chain. Among the materials which may gainfully be employed for this purpose are the unsaturated polycarboxylic acids such as, maleic, fumaric, citraconic, itaconic, and acetylene dicarboxylic acids and esters and halogen substituted derivatives thereof, etc.; the unsaturated polyhydric alcohols such as butene-diol, dipropylene glycol and pentene-diol, also unsaturated hydroxy ethers such as allyl or vinyl glycerol ethers and allyl or vinyl pentaerythritol ethers, etc.; still other chemical compounds comprising an ethylenic or an acetylenic linkage which are not rendered unreactive in the polyester chain by their chemical combination into the polyester chain by way of other functional groups, whereby the mixed esters of adducts of hexahalocyclopentadiene are produced.

Another method of providing for copolymerizable unsaturation in the polyester chain which may be employed involves effecting the diene synthesis of a hexahalocyclopentadiene with a polybasic alcohol or acid or ester, or equivalents thereof, which contains at least two olefinic linkages, one of which is reactive in the diene synthesis, while the others which are unreacted are capable of being copolymerizable in the cross-linking reaction. Among the materials which are useful for this purpose are acetylenic compounds and di-olefinic and poly-olefinic compounds.

Alternatively, or in addition to including the flame retardant component in the unsaturated polyester, we have found that the chlorine content of the final polyester formulations may be obtained, or, substantially increased, by employing a cross-linking agent which also contains the component which imparts flame retardance to the final compositions of this invention. Among such cross-linking agents which may be useful for this purpose are the following: Diallyl-1,4,5,6,7,7-hexachlorobicyclo-(2.2.1)-5-heptene-2,3-dicarboxylate; Diallyl-1,4,5,6,7,7-hexachloro-2-methylbicyclo-(2.2.1)-5-heptene-2,3 - dicarboxylate; Diallyl-1,2,4,5,6,7,7-heptachlorobicyclo-(2.2.1) - 5-heptene-2,3-dicarboxylate; and Triallyl-1,4,5,6,7,7-hexachlorobicyclo-(2.2.1)-5-heptene-2-acetate-2,3 - dicarboxylate. These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example, reaction products of hexachlorocyclopentadiene with isoprene or butadiene retaining a reactive unsaturated linkage can be used as cross-linking agents directly without further reaction. Still other methods for the preparation of the unsaturated cross-linking agents, employing type reactions known to the art, will be apparent from the foregoing. In addition, materials such as triallyl cyanurate may be employed for improving heat resistance; diallyl maleate and similar mono- or poly-vinyl or mono- or poly-allyl derivatives, divinyl benzene, monochlorostyrene, and diallyl phthalate are also useful.

It is apparent from a consideration of the foregoing examples and the foregoing discussion that the particular chemical ingredients selected and their relative proportions may be varied over a wide range to produce a wide variety of compositions embraced within this invention. It should be emphasized that modifications can be made to accentuate any given property or combination of properties desired. For example, hardness in the final polyester resin can be varied by using short chain polyhydric alcohol and acids or long chain polyhydric alcohols and acids; the viscosity of the mixture comprising the unsaturated polyester and the olefinic cross-linking agent may be varied by changing the ratio of unsaturated polyester to olefinic cross-linking agent; and the curing characteristics of such mixtures can be varied by changing the kind and proportion of polymerization catalyst employed. In order to accentuate both flame retardance and heat resistance, we prefer that the hexahalocyclopentadiene content should not be less than that sufficient to supply a final product of not less than ten percent of halogen by weight of the polyester resin compositions; the upper limit for the hexahalocyclopentadiene content is generally dictated by practical limits determined by the minimum necessary concentration of glycols and unsaturated dibasic acids not being adducts of hexahalocyclopentadiene and olefinic compounds to give resinous compounds capable of being hardened and this upper limit is about 60 percent. Flame retardance may be accentuated by adding to the unsaturated polyester containing a hexahalocyclopentadiene component, a cross-linking agent which also contains flame retardant properties obtained from a hexahalocyclopentadiene in chemical combination therewith. It may be further accentuated by esterifying a polycarboxylic acid and polyhydric alcohol which each contain the hexahalocyclopentadiene flame retardant component of this invention and cross-linking this with a fire resistant cross-linking agent. Mechanical strength can be accentuated, for example, by employing diallyl diglycol carbonate as the cross-linking agent with a linear unsaturated polyester resin of this invention, similar to that given in Example 20, and forming glass cloth laminates one-eighth inch in thickness. The flexural strength at room temperature of such a laminated resin is as high at 85,000 pounds per square inch and modulus of elasticity is $4.16 \times 10^6$ pounds per square inch.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in cross-linking agent and thereafter effecting the copolymerization in the presence of catalysts and heat to produce the foamed article. Formulations which are useful for making moldings embodying the compositions of this invention may be made by mixing into the unsaturated linear polyester and olefinic cross-linking agent mixture a fibrous reinforcing medium and/or an inert filler such as chopped fiber glass rovings, macerated fabric, asbestos fibers and mica, which serve as fibrous reinforcing media and incorporating a small percentage of a mold lubricant, catalyst and/or promoter.

An infinite variety of products may also be prepared, which embody the copolymers of this invention, by copolymerizing the linear unsaturated polyester materials produced in accordance with this invention, as in Example 1, with a mono-olefinic cross-linking agent in the presence of another copolymerizable linear polyester material having different structure than that produced by this invention. For example, by dissolving 23.1 parts of the product of Example 1 and 4.3 parts of an unchlorinated commercial polyester resin dissolved in styrene and especially designed for imparting flexibility and designated as Paraflex P–13 (made by Rohm & Haas Company, Philadelphia, Pennsylvania) and 2.3 parts by weight of styrene and effecting the copolymerization of the mixture by a catalyst, a material is produced which has better flexibility and different properties than any materials produced heretofore. It is to be understood that dyes, pigments, plasticizers, lubricants and various other modifying agents are contemplated as being incorporated in certain formulations to produce compositions embraced in this invention in order to obtain or accentuate any given property.

We claim:

1. A polymerizable mixture comprising (A) a copolymerizable linear polyester comprised of (1) a polyhydric alcohol, (2) an adduct of hexahalocyclopentadiene and a polycarboxylic compound selected from the group consisting of polycarboxylic acids, acid anhydrides, acid halides and acid esters containing aliphatic carbon to carbon unsaturation wherein the halogen is selected from the group consisting of chlorine, bromine, fluorine and mixtures thereof, (3) a polycarboxylic compound selected from the group consisting of polycarboxylic acids, acid anhydrides, acid halides and acid esters containing aliphatic carbon to carbon unsaturation, (4) a polycarboxylic compound selected from the group consisting of (a) saturated aliphatic polycarboxylic acids and saturated aliphatic polycarboxylic acid anhydrides; and (b) aromatic polycarboxylic acids and aromatic polycarboxylic acid anhydrides; and (B) a polymerizable monomer containing a $CH_2=C=$ group.

2. A mixture of claim 1 wherein the hexahalocyclopentadiene of the adduct (2) is hexachlorocyclopentadiene.

3. A mixture of claim 1 wherein the polymerizable monomer (B) is styrene.

4. A mixture of claim 1 having a polymerization inhibitor added thereto.

5. A mixture of claim 1 when polymerized to an infusible, insoluble, resinous composition.

6. A mixture of claim 1 when mixed with an inert filler and polymerized to an infusible, insoluble, resinous composition.

7. A reinforced plastic article comprising a mixture of claim 1 when polymerized to an infusible, insoluble, resinous composition, and a fibrous reinforcing medium.

8. A laminated article comprising a plurality of sheets of glass fibrous material and a binder therefor, an insoluble, infusible, resinous composition resulting from the polymerization of a composition defined in claim 1.

9. A composition of matter comprising a copolymerizable linear polyester comprising (1) a polyhydric alcohol, (2) an adduct of hexahalocyclopentadiene and a polycarboxylic compound selected from the group consisting of polycarboxylic acids, acid anhydrides, acid halides and acid esters containing aliphatic carbon to carbon unsaturation, wherein the halogen is selected from the group consisting of chlorine, bromine, fluorine and mixtures thereof, (3) a polycarboxylic compound selected from the group consisting of polycarboxylic acids, acid anhydrides, acid halides and acid esters containing aliphatic carbon to carbon unsaturation, and (4) a polycarboxylic compound selected from the group consisting of (a) saturated aliphatic polycarboxylic acids and saturated aliphatic polycarboxylic acid anhydrides; and (b) aromatic polycarboxylic acids and aromatic polycarboxylic acid anhydrides.

10. A composition of claim 9 wherein the hexahalocyclopentadiene of the adduct (2) is hexachlorocyclopentadiene.

References Cited in the file of this patent

UNITED STATES PATENTS

| | | |
|---|---|---|
| 2,255,313 | Ellis | Sept. 9, 1941 |
| 2,593,787 | Parker | Apr. 22, 1952 |
| 2,779,701 | Robitschek et al. | Jan. 29, 1957 |